United States Patent
Aubert (10) Patent No.: US 10,858,995 B2
(45) Date of Patent: *Dec. 8, 2020

(54) PASSIVE INTERNAL ICE PROTECTION SYSTEMS FOR ENGINE INLETS

(71) Applicant: BELL HELICOPTER TEXTRON INC., Fort Worth, TX (US)

(72) Inventor: Roger J. Aubert, Arlington, TX (US)

(73) Assignee: BELL HELICOPTER TEXTRON INC., Fort Worth, TX (US)

(*) Notice: Subject to any disclaimer, the term of this patent is extended or adjusted under 35 U.S.C. 154(b) by 83 days.

This patent is subject to a terminal disclaimer.

(21) Appl. No.: 16/016,159

(22) Filed: Jun. 22, 2018

(65) Prior Publication Data

US 2018/0298818 A1    Oct. 18, 2018

Related U.S. Application Data

(63) Continuation of application No. 14/947,325, filed on Nov. 20, 2015, now Pat. No. 10,036,320.

(51) Int. Cl.
 *B01D 41/00* (2006.01)
 *F02C 7/055* (2006.01)
 (Continued)

(52) U.S. Cl.
 CPC .............. *F02C 7/055* (2013.01); *B64C 27/06* (2013.01); *B64D 27/14* (2013.01); *B64D 33/02* (2013.01);
 (Continued)

(58) Field of Classification Search
 CPC .......... F02C 7/055; F02C 7/047; B64C 27/06; F05D 2300/171; F05D 2300/614; F05D 2220/329; F05D 2230/60; B64D 33/02; B64D 2033/022; B64D 2033/0233; B64D 2033/0246
 See application file for complete search history.

(56) References Cited

U.S. PATENT DOCUMENTS 2,764,390 A   9/1956  Harris
3,124,545 A   2/1964  Meletiou
(Continued)

FOREIGN PATENT DOCUMENTS

EP     2860113 A1    4/2015
EP     2995556 A1    3/2016
(Continued)

OTHER PUBLICATIONS

European Patent Office, European Search Report for EP Appl. No. 161706239, dated Mar. 22, 2017, 4 pp.
(Continued)

*Primary Examiner* — Dung H Bui
(74) *Attorney, Agent, or Firm* — Daniel J. Chalker; Edwin S. Flores; Chalker Flores, LLP (57) ABSTRACT

A system includes an engine cover covering a side-facing rotorcraft engine and having an opening and an ice protection member mounted on the engine cover between the opening and the engine, an area of the ice protection member smaller than an area of the opening. The ice protection member is configured to partially cover the opening to prevent ice having a particular size from entering into the engine and to allow air flow downstream into the engine.

20 Claims, 7 Drawing Sheets

(51) Int. Cl.
  *B64D 27/14* (2006.01)
  *B64D 33/02* (2006.01)
  *B64C 27/06* (2006.01)
  *F02C 7/047* (2006.01)

(52) U.S. Cl.
  CPC .......... *B64D 2033/022* (2013.01); *B64D 2033/0233* (2013.01); *B64D 2033/0246* (2013.01); *F02C 7/047* (2013.01); *F05D 2220/329* (2013.01); *F05D 2230/60* (2013.01); *F05D 2300/171* (2013.01); *F05D 2300/614* (2013.01)

(56) References Cited

U.S. PATENT DOCUMENTS

| | | | |
|---|---|---|---|
| 3,196,598 A * | 7/1965 | Olson | B64D 33/02 55/306 |
| 3,352,104 A | 11/1967 | Duerr | |
| 3,421,296 A | 1/1969 | Beurer, Sr. | |
| 3,426,981 A | 2/1969 | Allcock | |
| 3,449,891 A | 6/1969 | Shohet et al. | |
| 3,483,676 A | 12/1969 | Sargisson | |
| 3,871,844 A | 3/1975 | Calvin, Sr. | |
| 4,561,245 A | 12/1985 | Ball | |
| 4,688,745 A | 8/1987 | Rosenthal | |
| 4,933,546 A | 6/1990 | Muntz et al. | |
| 5,029,440 A | 7/1991 | Graber et al. | |
| 5,662,292 A | 9/1997 | Greene et al. | |
| 5,697,394 A | 12/1997 | Smith et al. | |
| RE36,215 E | 6/1999 | Rosenthal | |
| 6,267,328 B1 | 7/2001 | Vest | |
| 6,595,742 B2 | 7/2003 | Scimone | |
| 7,192,462 B2 | 3/2007 | Stelzer et al. | |
| 7,246,480 B2 | 7/2007 | Ritland | |
| 7,575,014 B2 | 8/2009 | Stelzer | |
| 7,871,455 B1 | 1/2011 | Sands et al. | |
| 7,938,368 B2 | 5/2011 | Hogate | |
| 8,049,147 B2 | 11/2011 | Hogate | |
| 8,052,767 B2 | 11/2011 | Sands et al. | |
| 8,246,291 B2 | 8/2012 | Wolford | |
| 8,334,486 B2 | 12/2012 | Hogate | |
| 8,512,450 B2 | 8/2013 | Kazlauskas et al. | |
| 8,819,937 B2 | 9/2014 | DeDe et al. | |
| 2009/0261208 A1 | 10/2009 | Belyew | |
| 2012/0017564 A1 | 1/2012 | Dhingra et al. | |
| 2013/0092798 A1 | 4/2013 | Boyce | |
| 2015/0166194 A1 | 6/2015 | Jactat et al. | |
| 2016/0075439 A1 | 3/2016 | Mores et al. | |
| 2017/0145919 A1 | 5/2017 | Aubert | |

FOREIGN PATENT DOCUMENTS

| | | |
|---|---|---|
| EP | 3091211 A1 | 11/2016 |
| EP | 3170751 A1 | 5/2017 |
| WO | 2007028689 A1 | 3/2007 |
| WO | 2007090011 A2 | 8/2007 |
| WO | 2012128778 A1 | 9/2012 |

OTHER PUBLICATIONS

European Patent Office, Communication pursuant to Article 94(3) EPC for EP Appl. No. 161706239, dated Apr. 3, 2017, 7 pp.

* cited by examiner

PASSIVE INTERNAL ICE PROTECTION SYSTEMS FOR ENGINE INLETS

CROSS-REFERENCE TO RELATED APPLICATION

This application is a continuation of and claims priority to U.S. patent application Ser. No. 14/947,325, entitled "Passive Internal Ice Protection Systems for Engine Inlets", filed Nov. 20, 2015. The entire contents of which are hereby incorporated by reference.

TECHNICAL FIELD

This disclosure relates to ice protection systems for inlets, for example, for engine inlets of aircrafts, rotorcrafts, other automobiles or any engine system that operates in an environment in which ice can be formed.

BACKGROUND

During operation, gas turbine engines, e.g., used in aerospace applications, face an undesirable risk of ice accretion on engine components. Ice that forms on engine inlet components can block the air path to the engine and/or be ingested by the engine, potentially causing loss or performance, damage or wear to the engine. To avoid such problems, an ice protection system is provided to reduce ice formation on engine inlet and control ice ingestion by the engine compressor while minimizing impact on engine performances. Typically engine companies tend to rely on airframers to provide such inlet protection: some engine inlets include integrated systems such as heaters to prevent ice accumulation or outside contour passive protection or in a combination of overlapping protection to prevent ice ingestion.

SUMMARY

This disclosure describes passive internal ice protection systems for engine inlets. Such ice protection systems can be used in aircrafts or rotorcrafts and provide protection with a single mesh screen without protruding outside aircraft contour.

Some aspects of the subject matter can be implemented as air inlet systems. A system includes an engine cover covering a side-facing rotorcraft engine, the engine cover having an opening; and an ice protection member mounted on the engine cover between the opening and the engine, an area of the ice protection member smaller than an area of the opening. The ice protection member is configured to partially cover the opening to prevent ice having a particular size from entering into the engine and to allow air flow downstream into the engine.

This, and other aspects, can include one or more of the following features. The ice protection member can include a mesh screen. The mesh screen can be configured to catch and hold the ice with suction generated by an air flow into the engine, the particular size of the ice larger than a size certified for the engine. The ice protection member can be configured to catch the ice with the particular size of about slightly wider than a half of the opening. The mesh screen can include a plurality of pores each having a pore size of about 0.25 inch up to 0.50 inch. The mesh screen can include stainless steel. The ice protection member can include a frame surrounding the mesh screen, and the frame can include fiberglass. The ice protection member can be mounted on the engine cover by fastening the frame onto the engine cover.

The engine cover can be configured to be mounted on a side surface of the rotorcraft that comprises a front end and a back end, and the ice protection member can be mounted on the engine cover close to the back end such that a particular portion of the opening close to the front end remains open. An area of the particular portion of the opening, together with an area of porosity through the ice protection member, can be about 85% of the area of the opening.

The ice protection member can include a first part and a second part positioned with a folding angle. The folding angle can be about 90 degree, and the first part extends in a first direction from the back end to the front end, and the second part can extend upwards to the opening in a second direction perpendicular to the first direction. The first part can include one or more folding lines parallel to the first direction to accommodate a shape of the engine cover. The system can further include one or more brackets configured to hold the first part under the one or more folding lines and be fastened to the second part and further to the engine cover. The system can be configured to be a flush type engine inlet, wherein the engine is a helicopter gas turbine engine. The system can further include a filter positioned below the opening of the engine cover and between the ice protection member and the engine.

Some aspects of the subject matter can be implemented as a method. A mesh screen is framed to form an ice protection member. The ice protection member is mounted on an engine cover having an opening, an area of the ice protection member smaller than an area of the opening, the ice protection member partially covering the opening. The engine cover is mounted to cover a side-facing rotorcraft engine, such that the ice protection member is positioned between the opening of the engine cover and the engine. During operation, air flows downstream into the engine through the opening and the ice protection member prevents ice with a particular size entering into the engine.

This, and other aspects, can include one or more of the following features. Mounting the engine cover can include mounting the engine cover on a side surface of the rotorcraft that comprises a front end and a back end, and the ice protection member can be mounted on the engine cover close to the back end such that a particular portion of the opening close to the front end remains open. An area of the particular portion of the opening together with an area of porosity through the ice protection member, can be about 85% of the area of the opening, and the ice protection member can be configured to hold the ice with the particular size larger than a size certified for the engine. The ice protection member can include a first part and a second part positioned with a folding angle, and mounting the ice protection member can include holding the first part with one or more brackets along one or more respective folding lines of the first part and fastening the one or more brackets to the second part and further to the engine cover.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes a passive internal ice protection member for an inlet system, e.g., an engine inlet of a side-facing rotorcraft engine. The engine inlet includes an engine cover covering the engine. The engine cover has an opening via which air flows downstream to the engine, e.g., to a compressor of the engine. The ice protection member is mounted on the engine cover between the opening and the engine. For example, the ice protection member can be positioned below the opening and inside a passage defined from the opening to the compressor of the engine. The ice protection member has an area smaller than an area of the opening and is configured to partially cover the opening to prevent ice exceeding a size certified for the engine from entering into the engine and to allow enough air flow downstream into the engine.

The ice protection member can include a mesh screen that partially covers a percentage of the opening of the inlet, which can prevent the engine from ice congestion and also minimize the impact on engine performances. Moreover, the ice protection member is passive and does not need active components such as heaters and/or monitors. Such a passive ice protection system can reduce system cost and complexity and require no or little maintenance. The ice protection member is easy to install and can minimize installation losses. Besides engine inlets, this passive internal ice protection member can also be used in any other flow generation system requiring foreign object damage (FOD) protection. For example, the passive internal ice protection member can be applied for protection from rags, sand, dust, and/or ice.

Figure 1A:
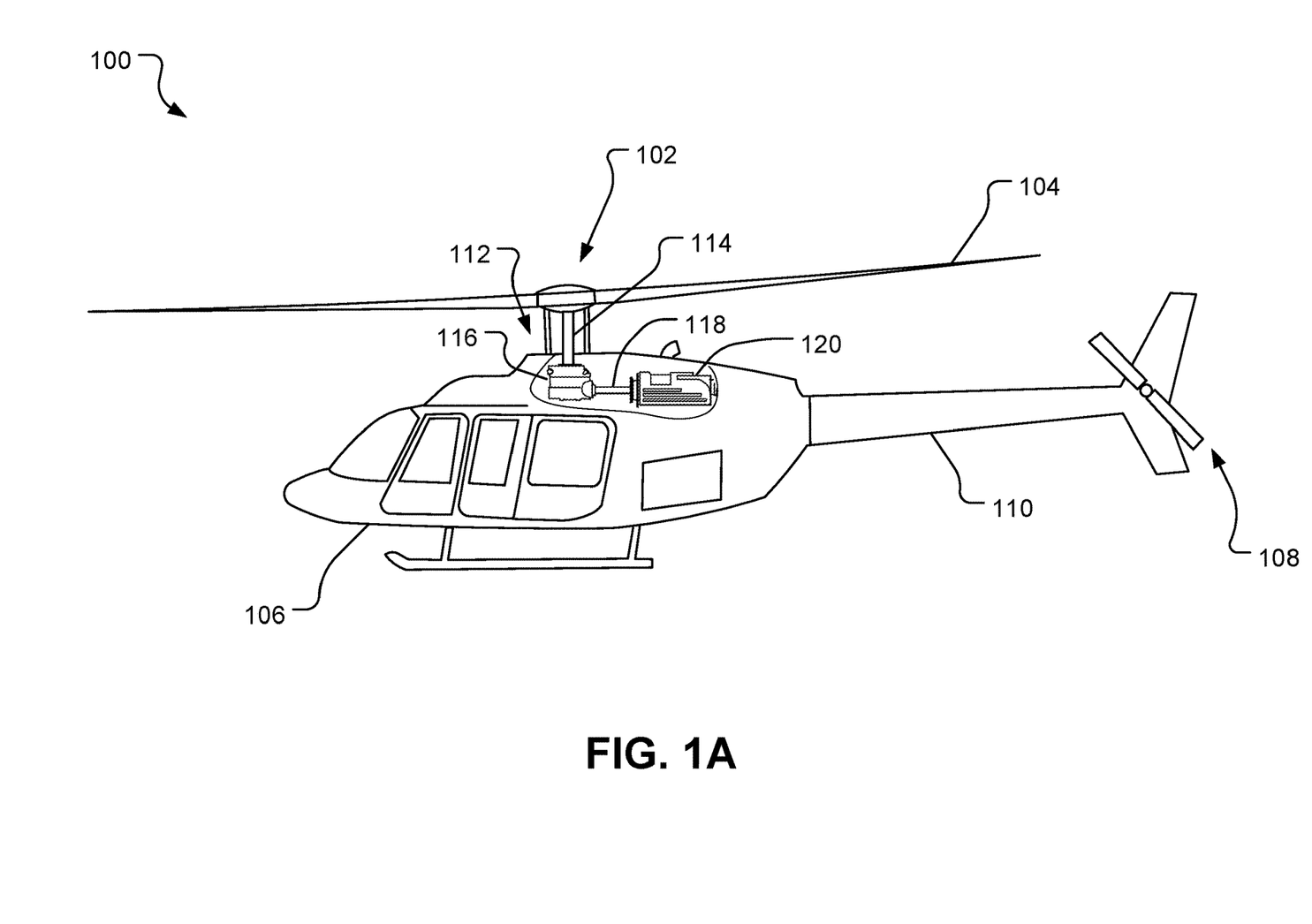
FIG. 1A is a schematic diagram of an example rotorcraft.

FIG. 1A shows a schematic diagram of a rotorcraft 100 according to an embodiment of the disclosure. It should be understood that while the rotorcraft 100 example depicted comprises a helicopter, embodiments of the disclosure are not limited to any particular setting or application, and embodiments may be used in any setting or application requiring FOD protection. Such a setting or application can include, for example, tiltrotor aircrafts, gas turbine systems, automotive transmission systems, to name a few.

The rotorcraft 100 has a rotor system 102 with multiple rotor blades 104. The rotorcraft 100 can further include a fuselage 106, an anti-torque system 108, and an empennage 110. An outline or an outer surface of the fuselage 106 can be defined as a contour of the rotorcraft 100. The rotorcraft 100 also includes an engine 120 that provides power to the rotor system 102 and/or the anti-torque system 108.

In some implementations, the engine 120 supplies torque to the rotor system 102 for rotating the rotor blades 104 via a gearbox system 112. The gearbox system 112 can include a mast 114 (e.g., a rotating shaft), a gearbox 116, and a gearbox shaft 118. The gearbox shaft 118 is configured to be mechanically coupled to the engine 120 and the gearbox 116 and be capable of transmitting torque and rotation. The gearbox 116 can be mechanically coupled to the rotor system 102 via the mast 114 that is also capable of transmitting torque and rotation. In some examples, the rotor system 102 has a control system for selectively controlling the pitch of each rotor blade 104 in order to selectively control direction, thrust, and lift of the rotorcraft 100.

Figure 1B:
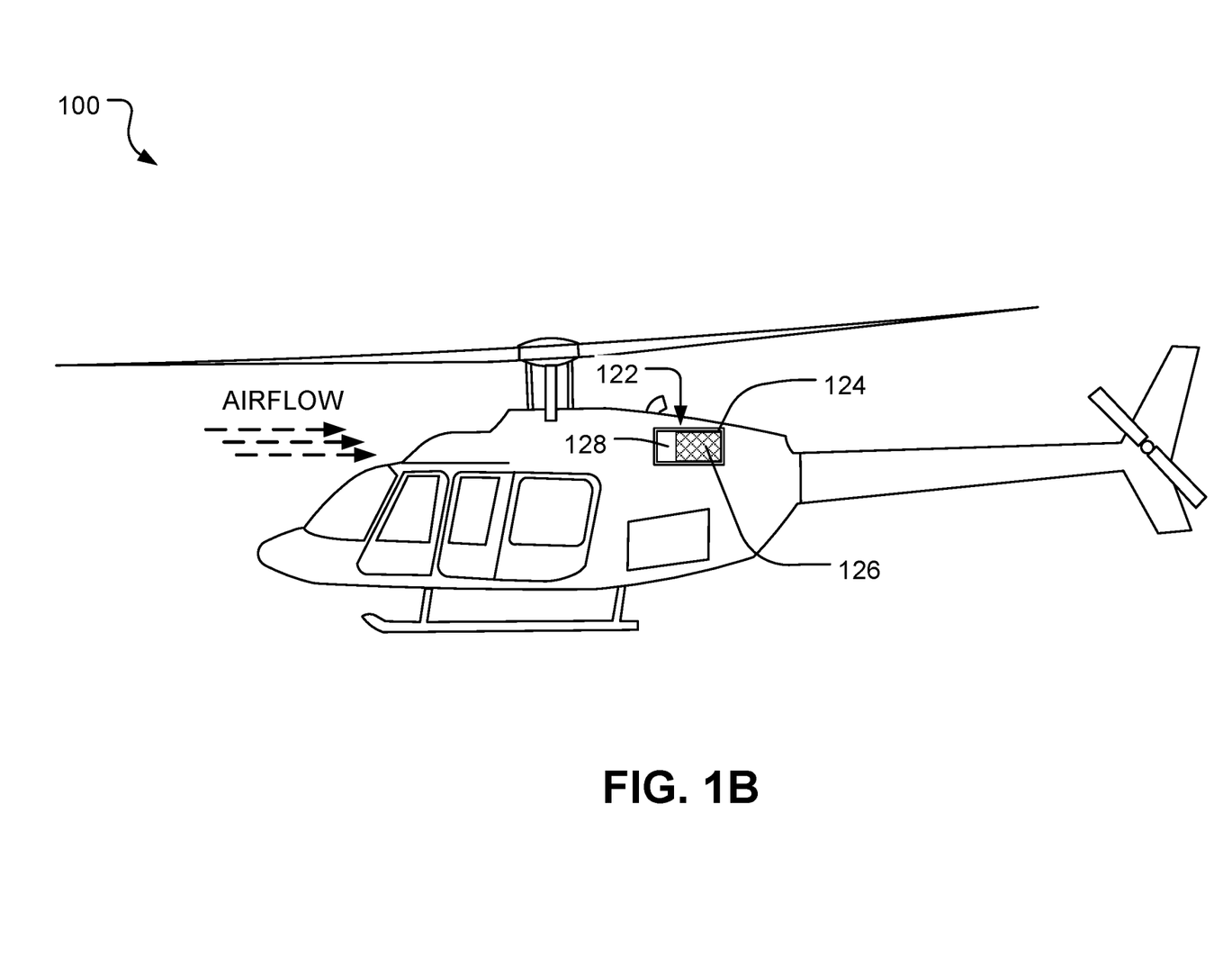
FIG. 1B is a schematic diagram of the example rotorcraft of FIG. 1A having an example engine inlet including an internal ice protection member.

FIG. 1B is a schematic diagram of an example engine inlet 122 of the example rotorcraft 100. The engine 120 can be a side-facing engine, and the engine inlet 122 can be a flush type engine inlet for the side-facing engine and positioned on a side face of the fuselage 106. When the rotorcraft 100 moves forward, air flows backward from a front end of the rotorcraft 100 to a back end of the rotorcraft 100. The air can be sucked downstream through the inlet 122 into the engine 120, e.g., into a compressor of the engine 120.

As discussed in FIGS. 2A-2D with further details below, the engine inlet 122 can include an engine cover 124, e.g., an engine cowling, and an ice protection member 126. The engine cover 124 includes an opening for air flow, and the ice protection member 126 can partially cover the opening of the engine cover 124 such that a particular portion 128 of the opening remains open. As illustrated in FIG. 1B, the ice protection member 126 can be mounted on the back of the engine cover 124 that is close to the back end of the rotorcraft 100 such that the particular portion 128 is in the front of the engine cover 124 that is close to the front end of the engine 120. The ice protection member 126 is configured to be sufficiently large to prevent large pieces of ice to be ingested by the engine 120 and only cover a percentage of the opening to minimize the impact on engine performances.

In some implementations, the ice protection member 126 includes a single layer of mesh screen. The single layer protection can be designed to allow ice to form on its mesh. The ice can be kept in place on the protection mesh screen by suction generated by the engine airflow until the ice melts and passes through fine structures of the mesh screen. The mesh screen can have a pore size small enough to prevent ice larger than a certified size for the engine 120 from entering into the engine 120.

Figure 2A:
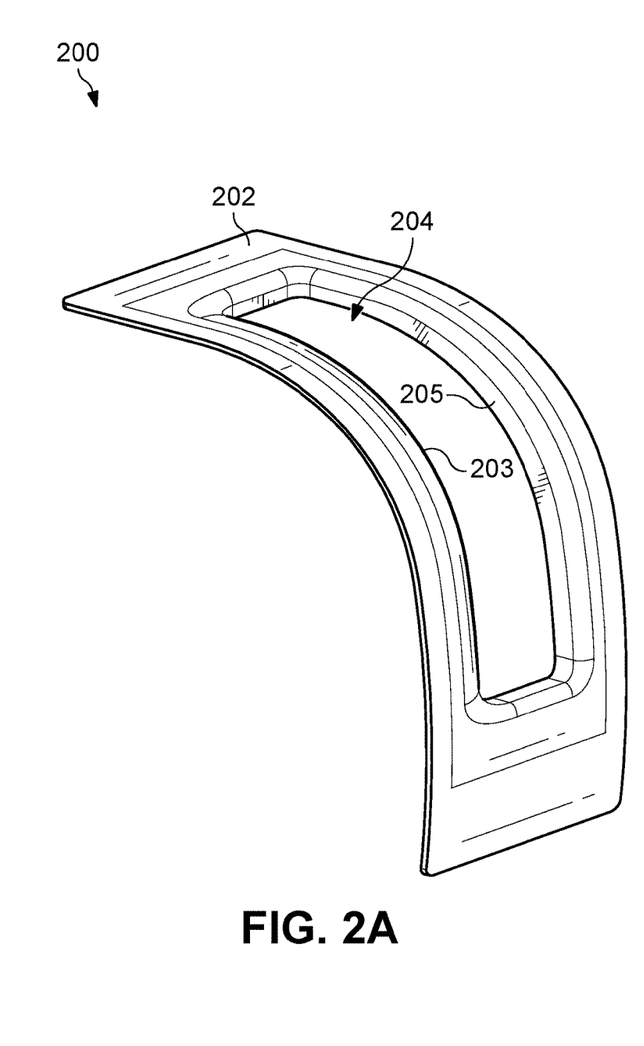
FIG. 2A is a schematic diagram of an example engine cover.
Figure 2B:
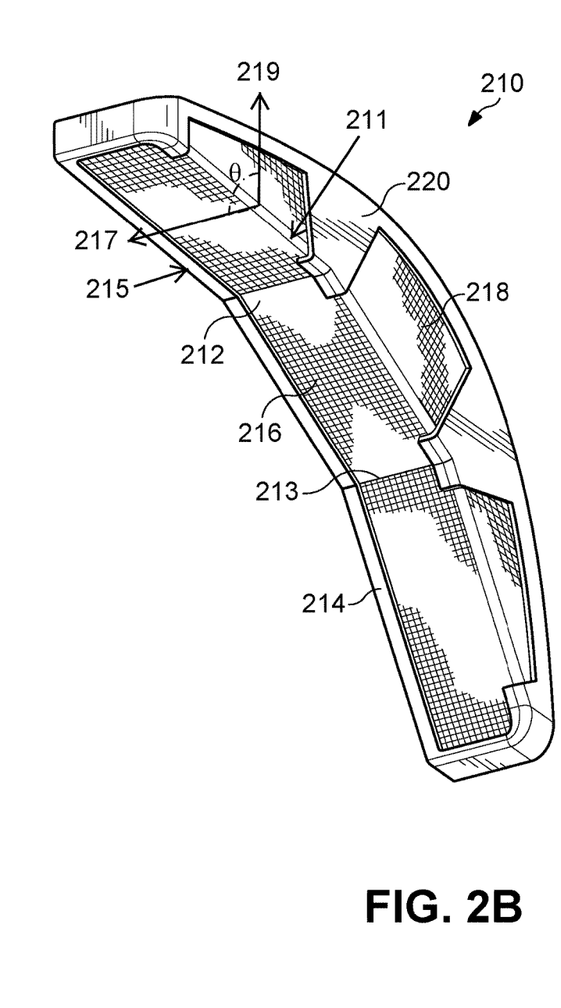
FIG. 2B is a schematic diagram of an example ice protection member.
Figure 2C:
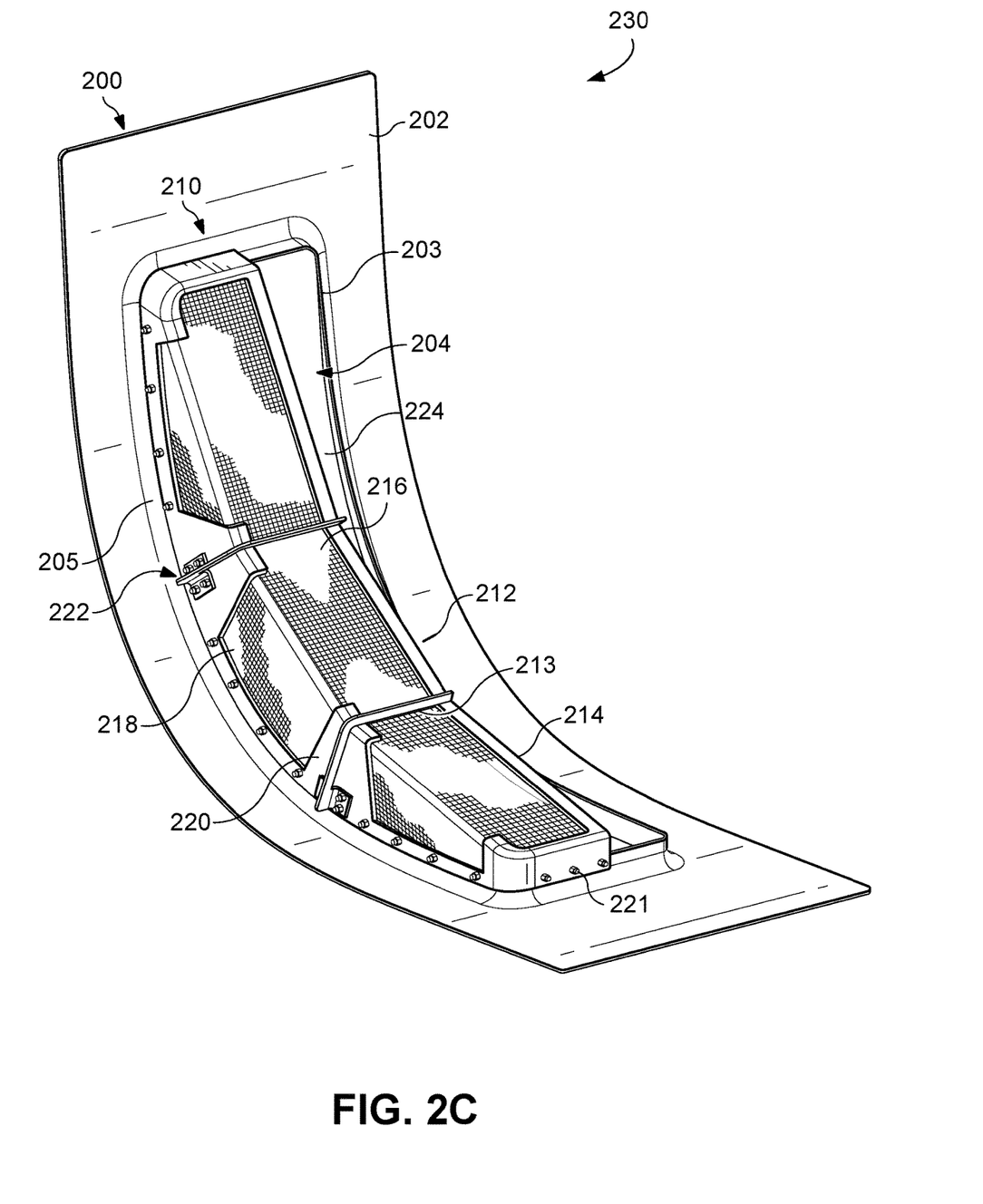
FIG. 2C is a schematic diagram of an example inlet system including an example internal ice protection member on an example engine cover.

FIGS. 2A-2C show an example inlet system 230 including an example engine cover 200 and an example internal ice protection member 210. FIGS. 2A and 2B show the engine cover 200 and the ice protection member 210, respectively, and FIG. 2C shows the inlet system 230 with the ice protection member 210 mounted on the engine cover 200. The inlet system 230, the engine cover 200, and the ice protection member 210 can be similar to the engine inlet 122, the engine cover 124, and the ice protection member 126 of FIG. 1B, respectively.

Referring now to FIG. 2A, the engine cover 200 includes a body 202 that is curved to cover a side-surfacing engine, e.g., in accordance with a contour of a fuselage of a rotorcraft. The body 202 can be made of stainless steel or any other suitable material. The body 202 defines an opening 204, e.g., in a middle of the engine cover 200. The opening 204 can also have a curved shape. Inside edges 203 and 205 of the body 202 define a front end and a back end of the opening 204. When the engine cover 200 is mounted onto the rotorcraft to cover the engine, the front edge 203 of the body 202 is close to a front end of the rotorcraft and the back edge 205 of the body 202 is close to a back end of the rotorcraft. When the rotorcraft moves forward, air flows backward from the front end of the rotorcraft to the back end of the rotorcraft and is sucked downstream through the opening 204 into the engine.

Referring to FIG. 2B, the ice protection member 210 is configured to catch and hold ice with suction generated by an air flow into the engine to thus prevent ice with a particular size from entering into the engine. The particular size of the ice is larger than a size certified for the engine. The ice protection member 210 is also configured to minimize impact on engine performances. The ice protection member 210 can only partially cover the opening 204 of the engine cover 200 such that a percentage of the opening 204 remains open to allow enough air flow downstream into the engine for operation.

In some implementations, the ice protection member 210 includes a mesh screen 212. The mesh screen 212 can be made of stainless steel or any other suitable material. The mesh screen 212 includes a number of pores each having a pore size, e.g., about 0.25 inch up to 0.50 inch. Edges of the mesh screen 212 can be kept thin. The ice protection member 210 can include a frame 214 surrounding the mesh screen 212, e.g., sealing around the edges of the mesh screen 212 to provide strength to the mesh screen and/or prevent the edges from harming people. The frame 214 can be made of fiberglass or any other suitable material.

In some examples, the ice protection member 210 includes a first part 216 and a second part 218 positioned with a folding angle θ. The folding angle θ can be 90 degree, an obtuse angle, or an acute angle. The first part 216 has a first side edge 211 and a second side edge 215. The first part 216 extends in a first direction 217 from a back edge 205 of the ice protection member 210 (e.g., an intersection of the first part 216 and the second part 218) to a front edge 203 of the ice protection member 210. The second part 218 extends upwards in a second direction 219 at an angle to the first direction, e.g., identical to the folding angle θ. During operation, the first part 216 can catch and support ice on the mesh screen 212 and the second part 218 can catch and hold the ice on the mesh screen 212.

In some cases, the first part 216 is curved to accommodate a shape of the engine cover 200, e.g., along one or more folding lines 213 parallel to the first direction. The frame 214 can include wide portions 220 positioned in the second part 218 corresponding to the folding lines 213. The wide portions 220 provide strength to the mesh screen 212.

FIG. 2C shows a perspective view of the example inlet system 230 when the ice protection member 210 is internally mounted on the engine cover 200. The edges of the body 202 of the engine cover 200 have a depth large enough for the ice protection member 210 to be internally mounted on and below the opening 204. The ice protection member 210 can be mounted onto the engine cover 200, e.g., by fastening the edges of the body 202 to the engine cover 200 with fasteners 221, e.g., pairs of blots and screws.

The inlet system 230 can include one or more brackets 222 to hold the ice protection member 210, e.g., the first part 216, under the one or more folding lines 213. The brackets 222 can be fastened to the ice protection member 210, e.g., to the wide portions 220 in the second part 218, and further to the edges of the body 202 of the engine cover 200. The ice protection member 210 is sandwiched by the brackets 222 and the engine cover 200. The inlet system 230 is configured to endure a maximum pressure differential across the ice protection member 210, which can be equivalent to an ice blocked the mesh screen 212 to make one engine inoperative.

The ice protection member 210 is mounted to partially cover the opening 204 of the engine cover 200 to keep a particular portion 224 of the opening 204 open. The perimeter of the open portion 224 is defined by inner edges of the engine cover 200, e.g., the front edge 203, and a front edge of the ice protection member 210, e.g., the frame 214. An area of the open portion 224 is separate from areas of open pores in the mesh screen 212. In a particular example, the mesh screen 212 covers a half of the opening 204 and thus the open portion 224 occupies another half of the opening 204. The mesh screen 212 can have a porosity ratio of about 70%. Thus, the area of the open pores of the mesh screen 212 is about 35% of an area of the opening 204, an area of the open portion 224 is about 50% of the area of the opening 204, thus the area of the open portion 224, together with the area of open pores of the mesh screen 212, is about 85% of the area of the opening 204. The area of the open portion 224 can be about 150 square inches. Keeping the portion 224 open enables the engine to suck enough amount of air into the engine for operation. Air can also be sucked into the engine through the open pores of the mesh screen 212, e.g., at a slower rate than air sucked through the open portion 224.

The ice protection member 210 is configured to catch and hold ice and prevent large pieces of ice into the engine. During operation, air flows backward from the front end of the rotorcraft to the back end of the rotorcraft. Due to momentum, ice carried in the air flow stream tends to go to the back side of the engine inlet 230. Thus, to catch and hold the ice, the ice protection member 210 can be mounted closer to the back edge 205 of the engine cover 200 than to the front edge 203, thus the open portion 224 is closer to the front edge 203 of the engine cover 200 than to the back edge 205. The first part 216 of the ice protection member 210 extends forward in a first direction from the back edge 205 to the front edge 203 of the engine cover 200, and the second part 218 extends upward to the opening 204 of the engine cover 200 in a second direction with an angle to the first direction. As the ice is unlikely to enter the engine through a front side of the engine inlet 230, as noted above, the open portion 224 is left uncovered to provide space for air flow downstream.

Figure 2D:
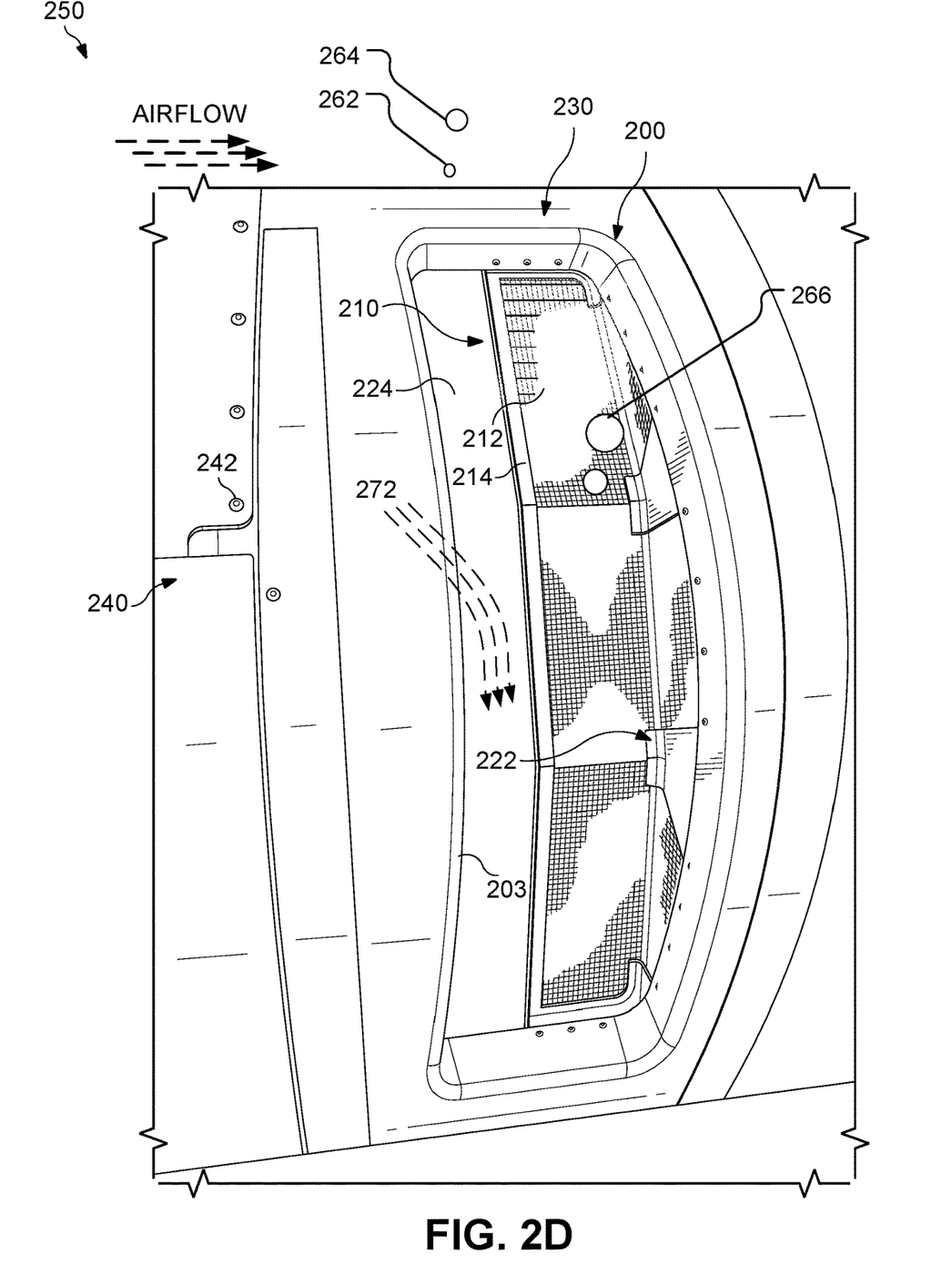
FIG. 2D is a schematic diagram of an example inlet system on an example rotorcraft.
Figure 2E:
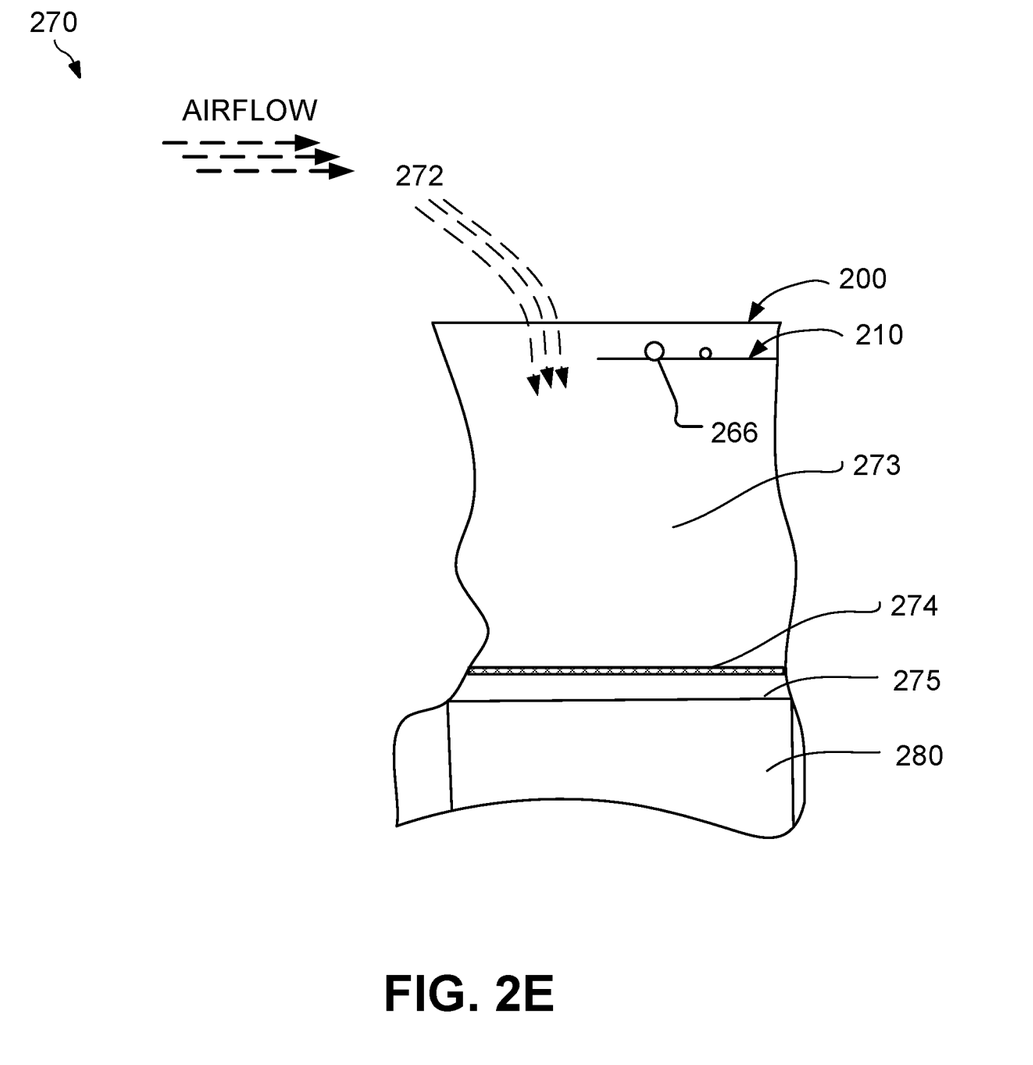
FIG. 2E is a schematic diagram showing a working principle of an example inlet system with an ice protection member.

FIG. 2D shows a perspective view 250 of the example inlet system 230 mounted on an example rotorcraft, e.g., the rotorcraft 100 of FIGS. 1A-1B. FIG. 2E shows a schematic diagram showing a working principle of the example inlet system. The rotorcraft can include a side-facing engine 280, and the inlet system 230 can be a flush type engine inlet for the side-facing engine 280 and be mounted on a side surface of a fuselage 240 of the rotorcraft. The engine cover 200 of the inlet system 230 can be configured to accommodate a contour of the side surface of the fuselage 240, such that the engine cover 200 can be seamlessly assembled onto the fuselage 240, e.g., by fasteners 242.

The engine cover 200 can be mounted below the side surface of the fuselage 240. As the ice protection member 210 is mounted below the opening 204 of the engine cover 200, the ice protection member 210 is positioned internally below the outside contour of the side surface of the fuselage 240. The ice protection member 210 can be configured to be far away from the engine 280, e.g., a compressor of the engine, to give air enough time to recover from a disturbance of going through the ice protection member 210. In some examples, a depth from the first part 216 of the ice protection member 210 to the side surface of the fuselage 240 is controlled by a height of the second part 218 of the ice protection member 210.

When the rotorcraft is in operation, e.g., flying forward, air flows backward from the front end of the rotorcraft to the back end of the rotorcraft. The airflow can be sucked downstream into the engine along a direction 272 through the open portion 224 and the ice protection member 210. The airflow can pass through a passage 273 defined from the opening 204 to a front face 275 of the engine 280.

Water drops 262 and/or ice 264 can be sucked together with air through the inlet system 230. When the water drops 262 hit the mesh screen 212, the water drops can freeze to ice. The ice can grow on the mesh screen 212, e.g., into an ice 266 with a larger size. The mesh screen 212 is configured to prevent ice with a size larger than a size certified for the engine 280 from entering into the engine 280. In some examples, the mesh screen 212 has a number of pores each having a pore size, e.g., about 0.25 inch up to 0.50 inch in diameter. The pore size can be smaller than the certified size for the engine 280. If the ice on the mesh screen has a smaller size than the pore size, the ice can go through the mesh screen into the engine. If the ice on the mesh screen has a larger size than the pore size, the ice can be kept in place by the engine suction until it melts to pass through the mesh screen. The ice 264 dropped with the airflow can be also kept in place by the engine suction until it melts. In some examples, the ice protection member 210 is configured to catch an ice with a particular size of about slightly wider than a half of the inlet opening 204. In a particular example, the ice protection member 210 is configured to catch the ice with about 9 inch long or with a size of about 9 inch by 3 inch by 0.375 inch. The folded ice protection member 210, together with the brackets 222 and the fasteners 221, can be configured to provide enough stiffness for the engine sucking the air and/or ice through the mesh screen 212 of the ice protection member 210.

In some implementations, a filter 274 is used for the engine 280 to filter out contaminants such as dirt, salt water, ice, or the like that could be ingested into the engine. The filter can include a mesh screen that is made of fiber. The filter 274 is positioned below the opening 204 in the air flow passage 273 and between the ice protection member 210 and the front face 275 of the engine 280. In some implementations, the filter 274 is positioned close to the front face 275 of the engine 280 and cover the passage 273 to the engine 280. In some examples, the filter 274 includes a monitor (not shown) for monitoring a contamination level on the filter 274.

Figure 3:
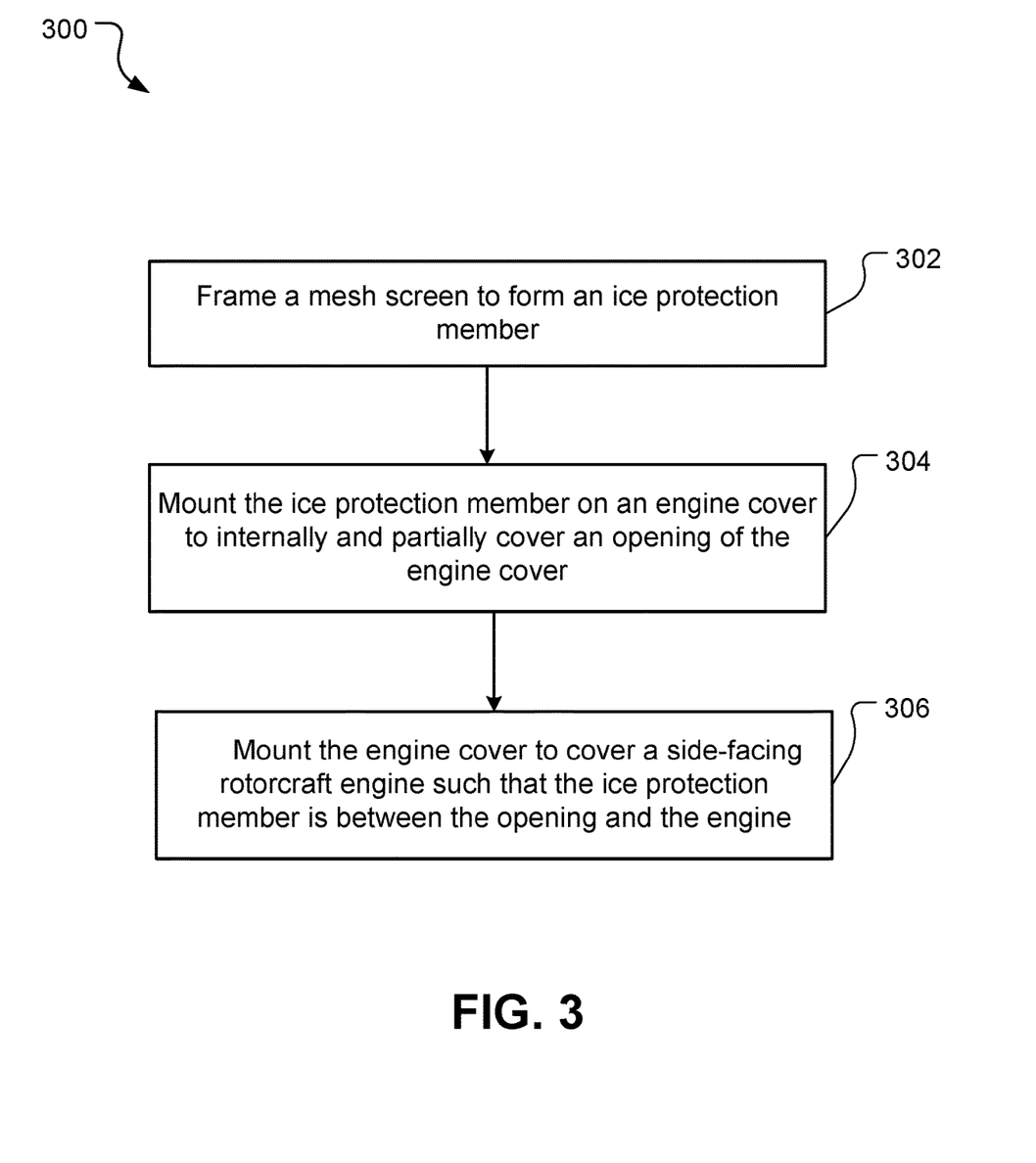
FIG. 3 is a flowchart of an example process according to an example embodiment of the disclosure.

FIG. 3 is a flowchart of an example process 300 for configuring an inlet system having a passive internal ice protection member for an aircraft or rotorcraft having a gas turbine engine. The inlet system can be similar to the engine inlet 122 of FIG. 1B or the inlet system 230 of FIGS. 2C-2D. The ice protection member can be similar to the ice protection member 126 of FIG. 1B or the ice protection member 210 of FIGS. 2B-2D.

At 302, a mesh screen is framed to form the ice protection member. The ice protection member is configured to catch and hold ice with a particular size larger than a size certified for the engine. The mesh screen can include a number of pores each having a pore size smaller than the certified ice size. The mesh screen can be made of stainless steel to prevent corrosion. The mesh screen can be framed at the edges of the mesh screen with fiberglass. In some examples, the ice protection member includes a first part and a second part positioned with a folding angle, e.g., 90 degree. The first part can be folded along one or more folding lines to accommodate a shape of an engine cover. The second part can include wide portions of fiberglass to strength the mesh screen.

At 304, the ice protection member is mounted on the engine cover to form the inlet system. The engine cover includes an opening, and an area of the ice protection member is smaller than an area of the opening. The ice protection member is configured to partially cover the opening such that a particular portion of the opening remains open. An area of the open portion, together with an area of porosity of the ice protection member, can be about 85% of the area of the opening of the engine cover.

The ice protection member can be mounted to the engine cover by fastening the edges of the ice protection member to inner edges of the engine cover that are below the opening. One or more brackets can be used to support the ice protection member, e.g., to hold the first part of the ice protection member under the folding lines. The brackets can be fastened to the second part and further to the engine cover.

At 306, the engine cover is mounted to cover the side-facing engine, such that the ice protection member is positioned between the opening of the engine cover and the engine. The engine cover is mounted on a side surface of the rotorcraft having a front end and a back end, and the ice protection member mounted on the engine cover is close to the back end of the rotorcraft and the open portion is close to the front end of the aircraft. During operation, air flows downstream into the engine through the opening and the ice protection member prevents ice congestion for the engine.

Thus, particular implementations of the subject matter have been described. Other implementations are within the scope of the following claims.

What is claimed is:

1. A flush type engine inlet comprising an ice protection apparatus comprising:
 a frame surrounding a mesh screen, the frame comprising a first part and a second part;
 the first part extending in a first direction from a back edge to a front edge;
 the second part connected to the back edge of the first part and extending in a second direction at a folding angle to the first part;
 the second part configured to be attached to the flush type engine inlet such that the first part and the second part are below an opening of the flush type engine inlet; and
 the first part configured to be smaller than the opening such that a portion of the opening remains uncovered at all times.

2. The flush type engine inlet of claim 1, wherein the folding angle comprises an obtuse angle, an acute angle or about 90 degrees.

3. The flush type engine inlet of claim 1, wherein the portion of the opening that remains uncovered comprises about 50% of an area of the opening.

4. The flush type engine inlet of claim 1, wherein:
 the first part further comprises a first side edge and a second side edge; and
 the second part is connected to first side edge of the first part-and extending in the second direction.

5. The flush type engine inlet of claim 1, wherein the mesh screen is configured to catch and hold a particular size of ice with a suction generated by an air flow into an engine, wherein the particular size of ice is larger than a size certified for the engine.

6. The flush type engine inlet of claim 1, wherein the mesh screen comprises a plurality of pores each having a pore size of about 0.25 inch up to 0.50 inch.

7. The flush type engine inlet of claim 1, wherein:
the mesh screen comprises stainless steel; or
the frame comprises fiberglass.

8. The flush type engine inlet of claim 1, further comprising:
an engine cover forming the flush type engine inlet, the engine cover comprising a body having inside edges that define a front end and a back end of the opening;
the second part attached to the inside edge of the back end of the opening;
the first direction comprises from the back end of the opening towards the front end of the opening; and
the second direction comprises upwards from the first part towards the back end of the opening.

9. The flush type engine inlet of claim 8, wherein the body of the engine cover is curved in accordance with a contour of a rotorcraft.

10. The flush type engine inlet of claim 8, further comprising a filter positioned below the opening between the first part and an engine.

11. The flush type engine inlet of claim 8, wherein the first part further comprises one or more folding lines parallel to the first direction to accommodate a shape of the engine cover.

12. The flush type engine inlet of claim 10, further comprising one or more brackets configured to hold the first part under the one or more folding lines and be fastened to the second part and further to the engine cover.

13. A method comprising:
providing a flush type engine inlet on a rotorcraft, the flush type engine inlet comprising an ice protection apparatus comprising:
a frame surrounding a mesh screen, the frame comprising a first part and a second part,
the first part extending in a first direction from a back edge to a front edge,
the second part connected to the back edge of the first part and extending in a second direction at a folding angle to the first part,
the second part configured to be attached to the flush type engine inlet such that the first part and the second part are below an opening of the flush type engine inlet, and
the first part configured to be smaller than the opening such that a portion of the opening remains uncovered at all times;
operating the rotorcraft wherein air flows downstream into an engine through the opening and the ice protection apparatus; and
preventing ice with a particular size from entering into the engine using the ice protection apparatus.

14. The method of claim 13, wherein the folding angle comprises an obtuse angle, an acute angle or about 90 degrees.

15. The method of claim 13, wherein the portion of the opening that remains uncovered comprises about 50% of an area of the opening.

16. The method of claim 13, wherein:
the first part further comprises a first side edge and a second side edge; and
the second part is connected to first side edge of the first part and extending in the second direction.

17. The method of claim 13, wherein the particular size of ice is larger than a size certified for the engine.

18. The method of claim 13, further comprising filtering the air flowing into the engine using a filter positioned below the opening between the first member and an engine.

19. The method of claim 13, wherein the ice protection apparatus further comprises:
an engine cover forming the flush type engine inlet, the engine cover comprising a body having inside edges that define a front end and a back end of the opening;
the second part attached to the inside edge of the back end of the opening;
the first direction comprises from the back end of the opening towards the front end of the opening; and
the second direction comprises upwards from the first part towards the back end of the opening.

20. The method of claim 13, wherein the first part further comprises one or more folding lines parallel to the first direction to accommodate a shape of the engine cover.

* * * * *